(No Model.)
C. S. BRADLEY & J. J. WOOD.
ELECTRIC MOTOR AND GENERATOR.
No. 481,220. Patented Aug. 23, 1892.
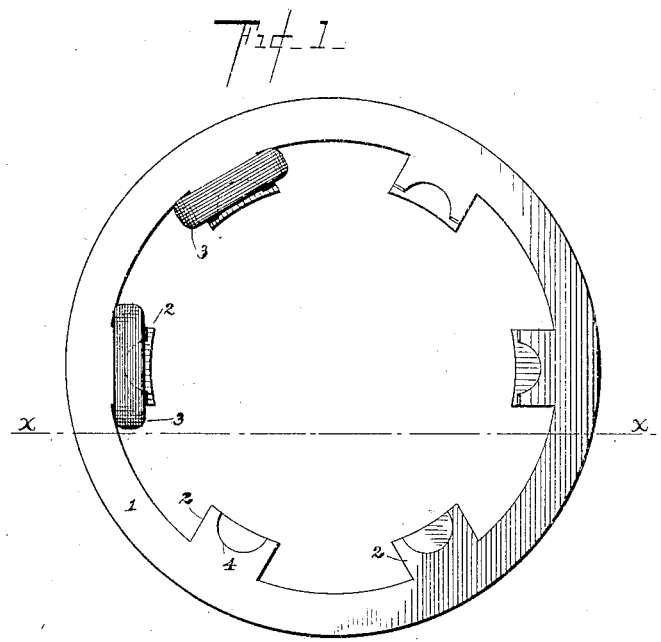
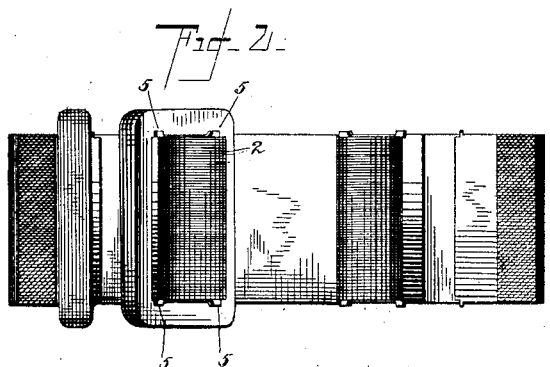
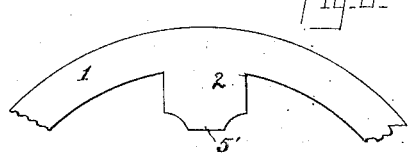

UNITED STATES PATENT OFFICE

CHARLES S. BRADLEY, OF AVON, NEW YORK, AND JAMES J. WOOD, OF FORT WAYNE, INDIANA.

ELECTRIC MOTOR AND GENERATOR.

SPECIFICATION forming part of Letters Patent No. 481,220, dated August 23, 1892.

Application filed August 22, 1891. Serial No. 403,413. (No Model.)

*To all whom it may concern:*

Be it known that we, CHARLES S. BRADLEY, residing at Avon, in the county of Livingston and State of New York, and JAMES J. WOOD, residing at Fort Wayne, in the county of Allen and State of Indiana, citizens of the United States, have invented certain new and useful Improvements in Electric Motors and Generators; and we do hereby declare the following to be a full, clear, and exact description of the invention, such as will enable others skilled in the art to which it appertains to make and use the same.

This invention relates to electric motors or generators, and more particularly to means for maintaining in position the coils on the pole-pieces of a multipolar magnet. In multipolar structures the pole-pieces radiate from or toward the center and the magnetizing-coils are first wound and then placed over the pole-pieces. Means must be provided to prevent a displacement of the coils by vibration of the machine when in operation. The means ordinarily employed are collars or equivalent devices sprung over the ends of the cores to form a flange, which retains the coils in position. Such a structure involves expensive fitting. We have provided a simple means of anchoring the coils. This end is accomplished in our invention by having on the edge of the pole-pieces a tongue which may be bent over or against the end of the coil to lock it firmly in place.

The invention may be variously carried out by widely-varying structures.

Figure 1 shows a side elevation with several coils locked in position; and Fig. 2 shows a section taken on a line $x$ $x$, Fig. 1. Fig. 3 shows a second form of locking-tongue.

As shown, 1 represents the ring-core with radial pole-pieces 2 2 to support the coils 3 3.

In alternating-current motors these cores are formed of a series of superposed laminated plates in a manner well understood by electricians. Two of these plates—namely, those at the sides of the core—are bent laterally over the edges of the coil. In order to facilitate bending in the pole-pieces of the outer plates a notch is made, as indicated at 4, so that the ends may be readily bent, or it may be cut away at the edges, as shown in Fig. 3, thus leaving a narrow projection which may be readily bent. It will thus be seen that when the coils are placed in position and the ends of the polar projections of the outer rings are bent outwardly the coils will be firmly anchored.

We desire to have it understood that the invention is not restricted to the specific organizations described, as the same end might be accomplished by providing each pole with an independent locking device secured to it in a suitable manner, the only essential feature being that such locking device shall be secured to the body of the core and shall be capable of being bent around the coil and fastened so as to firmly anchor it. It is also evident that the same device might be used for outwardly-projecting pole-pieces to prevent dislodgment by centrifugal action.

Having thus described our invention, what we claim as new, and desire to secure by Letters Patent, is—

1. A magnet for a dynamo-electric machine or motor comprising a laminated core, the side plates of the core having their polar projections bent over the end of the magnetizing-coils to retain them in position.

2. A multipolar magnet for a dynamo-electric machine or motor, comprising a series of laminated rings having projecting pole-pieces, the outer layers of the ring having their polar projections bent outwardly, so as to retain the magnetizing-coils in position.

3. A magnet for a multipolar machine comprising a series of laminated iron plates having projecting pole-pieces, auxiliary-plates with similarly-located projections superposed upon the iron plates, each projection being provided with a recess, so as to form two tongues to each set of coils, and polarizing-coils anchored by the said tongues when bent.

In testimony whereof we affix our signatures in presence of two witnesses.

CHARLES S. BRADLEY.
    JAMES J. WOOD.

Witnesses as to Bradley:
 CHAS. C. MILLER,
 THOS. H. DACCOMB.

Witnesses as to Wood:
 A. F. CHAPIN,
 H. W. WELLMAN.